Patented June 6, 1939

2,160,936

UNITED STATES PATENT OFFICE 2,160,936

POLYMERIZING VINYLIDENE CHLORIDE

John H. Reilly and Charles R. Russell, Midland, Mich., assignors to The Dow Chemical Company, Midland, Mich., a corporation of Michigan No Drawing. Application September 18, 1937, Serial No. 164,520

4 Claims. (Cl. 260—80)

This invention relates to the polymerization of vinylidene chloride, especially to a process whereby the polymer may be obtained directly as an amorphous, powdery material suitable for use as a molding powder.

When vinylidene chloride alone is subjected to polymerizing conditions, i. e., to the action of light, elevated temperatures, and/or catalysts, the polymeric product is ordinarily obtained as a rubbery or bone-like material. In order to fabricate articles from a polymer obtained in such state, it has ordinarily been the practice to subject the polymeric product to a temperature above the softening point thereof so that it may be worked while in a plastic state, or to comminute the solid product and thereafter subject the ground polymer to molding operations. The step of grinding or finely dividing a solid polymeric product has been only partially satisfactory. Vinylidene chloride, when agitated during polymerization, yields a granular product, but it is not readily workable at temperatures sufficiently below its decomposition temperature to permit of its practical employment in molding operations. It is desirable, however, when a thermoplastic substance is to be molded, to employ the material in a finely divided state, so as to obtain a shaped product of more uniform composition.

It is accordingly an object of the present invention to provide a polymerization process whereby a finely divided polymer of vinyidene chloride may be produced directly. which is suitable for employment in molding operations and the like. at moderate temperatures below its decomposition temperature.

We have now found that the foregoing object can be attained and readily workable polymers produced, by carrying out the polymerization of vinylidene chloride in the presence of a small amount of a non-polymerizable inert liquid, which is immiscible with water but miscible with monomeric vinylidene chloride, examples of which are ortho-dichloro-benzene, trichloro-benzene, mono-chloro-benzene, beta-beta'-dichloro-diethyl ether, acetylene tetrachloride, penta-chloroethane, and the like. If desired, the polymerization rate may be increased by elevating the reaction temperature or by incorporating in the mixture to be polymerized a small amount of a catalyst, such as, for example, phosphorus pentachloride, benzoyl peroxide, or mixtures of benzoyl peroxide with tetraethyl lead and a poly-halo-oxygen-containing organic compound, such as hexachloro-diphenyl oxide. Heat-stabilizing agents, coloring agents, plasticizers, and the like, which are not inhibitors of the polymerization of vinylidene chloride in the presence of a liquid of the type mentioned may be incorporated in the mixture prior to polymerization, if desired.

In a preferred method of carrying out the present invention, substantially pure monomeric vinylidene chloride is diluted with from about 1 to about 30 per cent of ortho-dichloro-benzene, by weight. The mixture is covered with a layer of water, which acts as a sealing agent to exclude air, and is allowed to stand, with or without agitation, at a temperature between room temperature and about 90° C. until polymerization is substantially complete, i. e., for a period ranging from a few hours to one week. When the mixture is agitated, the polymerization progresses more rapidly. The water or other covering liquid is decanted from the mixture, which is then warmed to vaporize the ortho-dichloro-benzene substantially completely therefrom. The polymerized vinylidene chloride is recovered as a white amorphous powder which is readily adapted to molding operations and the like and which has been found to be readily molded at temperatures somewhat lower than those required when forming shaped articles from a solid body of polymeric vinylidene chloride.

The following example is illustrative of the practice of our invention, but is not to be construed as limiting the same.

One liter (1271 grams) of a mixture consisting of 1168 grams of vinylidene chloride and 103 grams of ortho-dichloro-benzene was treated with 38 grams (3 per cent by weight) of a plasticizer consisting of phenoxy-propylene oxide and covered with a layer of water. The mixture was allowed to stand for about 4 days at a temperature of approximately 30° C. The water was removed by decantation and the ortho-dichlorobenzene was substantially completely removed from the mixture by evaporation in a current of warm air at a temperature between about 70° and about 90° C. The remaining product was a white powder which was readily molded at temperatures of approximately 175° C. A polymeric mass produced from the same batch of vinylidene chloride as was employed in this example, but in the absence of ortho-dichloro-benzene or a similar inert liquid, required molding temperatures between 190° and 220° C.

The amount of ortho-dichloro-benzene employed may be varied, but for convenience in removing it from the polymer, we have found that from about 1 to 10 per cent is satisfactory. When lesser amounts are employed the polymer is not produced in a uniformly amorphous state. On the other hand, if much larger quantities (above 40-50 per cent) are employed, there is a marked tendency of the polymer to gel. This latter is also a useful procedure for some purposes, as is set forth more fully in a co-pending application of one of the present inventors, Serial Number 164,521, filed September 18, 1937.

Liquids other than ortho-dichloro-benzene which may be employed in a manner similar to that given in the example, and with comparable results, are generally non-polymerizable, water-immiscible liquids, inert to the action of vinylidene chloride, and having boiling points above about 100° C., but with sufficient vapor pressure at that temperature to be readily removed from the polymer. Suitable examples are monochlorobenzene, trichlorobenzene, acetylene tetrachloride, pentachloroethane, dichloro-ethyl ether, etc. Some lower boiling water-immiscible liquids such as propylene chloride, trichloroethylene, ethylene chloride, trichloroethane, etc., may be similarly employed, and will yield an amorphous powdery or granular product, but are not generally as satisfactory as the solvents previously named.

The new process has among others the advantage of providing directly a polymeric product which can be molded at lower temperatures than a vinylidene chloride polymer produced in the absence of a water-immiscible inert liquid of the type herein described. Polymeric products have been obtained by our process which are moldable at temperatures between about 150° and 175° C. employing moderate pressures which would exert little if any plastic deformation on a polymer of vinylidene chloride produced in the absence of an inert liquid of the type described at the same molding temperature. Since lower molding temperatures and pressures can be employed with the product of our process, thermal decomposition of the polymeric product during fabrication operations is substantially eliminated.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises subjecting monomeric vinylidene chloride to polymerization in the presence of a relatively small amount of a non-polymerizable, water-immiscible, inert liquid which is miscible with monomeric vinylidene chloride, the vinylidene chloride being the only polymerizable compound present, separating the so-formed granular polymer and freeing it from remaining solvent, the product being characterized by being readily moldable without decomposition.

2. The process which comprises subjecting monomeric vinylidene chloride to polymerization in the presence of from 1 to 30 per cent of its weight of a non-polymerizable, water-immiscible, inert liquid which is miscible with monomeric vinylidene chloride, the vinylidene chloride being the only polymerizable compound present, separating the so-formed granular polymer and freeing it from remaining solvent, the product being characterized by being readily moldable without decomposition at temperatures at least 15 centigrade degrees lower than vinylidene chloride polymerized without the said inert liquid.

3. In a process for preparing a molding powder, the steps which consist in polymerizing vinylidene chloride in the presence of from 1 to about 30 per cent by weight of ortho-dichloro-benzene.

4. In a process for preparing a molding powder, the steps which consist in polymerizing vinylidene chloride in the presence of from 1 to about 30 per cent by weight of ortho-dichloro-benzene, and thereafter removing substantially completely the ortho-dichloro-benzene.

JOHN H. REILLY.
CHARLES R. RUSSELL.